(12) United States Patent
Imamoto

(10) Patent No.: US 8,533,589 B2
(45) Date of Patent: Sep. 10, 2013

(54) INFORMATION PROCESSING APPARATUS AND INFORMATION PROCESSING METHOD

(75) Inventor: Yoshiharu Imamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 12/240,352

(22) Filed: Sep. 29, 2008

(65) Prior Publication Data

US 2009/0089661 A1   Apr. 2, 2009

(30) Foreign Application Priority Data

Oct. 2, 2007   (JP) ................. 2007-259235

(51) Int. Cl.
G06F 17/24   (2006.01)
G06F 17/30   (2006.01)

(52) U.S. Cl.
USPC ........... 715/243; 715/205; 715/208; 715/209; 715/253; 715/273; 715/277

(58) Field of Classification Search
USPC ................. 715/205, 208, 209, 243, 253, 273, 715/277
See application file for complete search history.

(56) References Cited

U.S. PATENT DOCUMENTS

| | | | | |
|---|---|---|---|---|
| 5,638,443 | A | 6/1997 | Stefik et al. | 705/54 |
| 6,981,214 | B1 * | 12/2005 | Miller et al. | 715/234 |
| 7,085,741 | B2 * | 8/2006 | Lao et al. | 705/51 |
| 7,181,438 | B1 * | 2/2007 | Szabo | 1/1 |
| 7,725,401 | B2 * | 5/2010 | Raley et al. | 705/59 |
| 2005/0172226 | A1 * | 8/2005 | Kobashi et al. | 715/518 |
| 2005/0288939 | A1 * | 12/2005 | Peled et al. | 705/1 |

FOREIGN PATENT DOCUMENTS

| | | |
|---|---|---|
| JP | 2004-259195 A | 9/2004 |
| JP | 2005-242992 A | 9/2005 |
| JP | 3738020 B2 | 1/2006 |

OTHER PUBLICATIONS

Japanese Office Action dated Oct. 19, 2012, issued by the Japanese Patent Office, in Japanese Patent Application No. 2007-259235.

* cited by examiner

*Primary Examiner* — Stephen Hong
*Assistant Examiner* — Wilson Tsui
(74) *Attorney, Agent, or Firm* — Fitzpatrick, Cella, Harper & Scinto

(57) ABSTRACT

An information processing apparatus includes an input unit adapted to input forming information related to a layout, a plurality of objects, and a policy which includes information on permission of usage of the plurality of objects and information on allowance of usage related to a layout for the plurality of objects. The apparatus further includes a first determination unit configured to determine based on the policy, for each of the plurality of objects, whether the usage of the object is permitted, and a second determination unit configured to determine based on the policy whether the forming information satisfies an allowed layout. The apparatus also includes an output unit configured to lay out and output the plurality of objects for which usage is permitted, in accordance with the forming information for which usage is permitted, when the first determination unit determines that usage of the respective objects is permitted and the second determination unit determines that the forming information satisfies the allowed layout. The output unit is controlled so as not to operate when the first determination unit determines that usage of any object is not permitted or the second determination unit determines that the forming information does not satisfy the allowed layout.

5 Claims, 16 Drawing Sheets

<Document>
<Paper size="A4"/>
<Page>
<Object><Position x="10" y="10"><Size height="30" width="80"><File>Address.ps</File></Size></Position></Object>
<Object><Position x="10" y="50"><Size height="30" width="80"><File>Message.ps</File></Size></Position></Object>
<Object><Position x="10" y="90"><Size height="30" width="30"><File>AD.ps</File></Size></Position></Object>
<Object><Position x="40" y="90"><Size height="30" width="30"><File>AD.jpg</File></Size></Position></Object>
</Page>
</Document>
```

<Policy>
<AllowedLayout Paper="A4" unit="px">
<Page>
<Object><Position x="10" y="10"><Size height="30" width="60"><ID type="url">A</ID></Size></Position></Object>  ~302
<Object><Position x="80" y="10"><Size height="30" width="60"><ID type="url">B</ID></Size></Position></Object>  ~303
<Object><Position x="10" y="50"><Size height="30" width="60"><ID type="url">C</ID></Size></Position></Object>  ~304
<Object><Position x="80" y="50"><Size height="30" width="60"><ID type="hash">4b8ac51b</ID></Size></Position></Object>  ~305
<Object><Position x="10" y="90"><Size height="30" width="60"><ID type="hash">dd907dde</ID></Size></Position></Object>  ~306
<Object><Position x="80" y="90"><Size height="30" width="60"><ID type="hash">bdf0734b</ID></Size></Position></Object>  ~307
</Page>
</AllowedLayout>
</Policy>
```

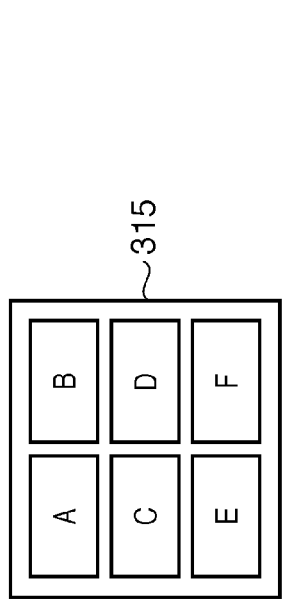

FIG. 3C

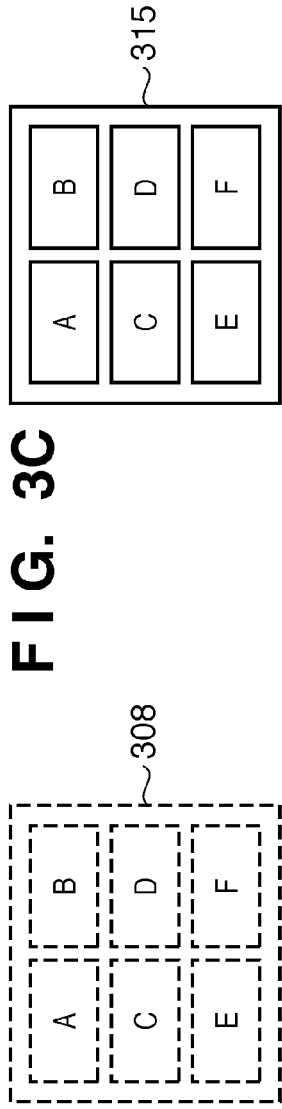

FIG. 3B

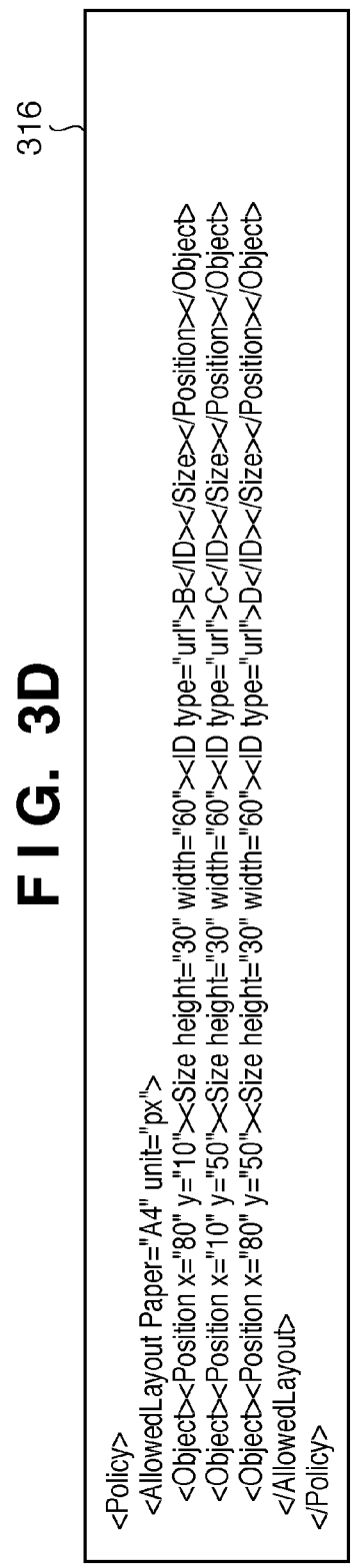

FIG. 3D

```
<Policy>
<AllowedLayout Paper="A4" unit="px">
<Object><Position x="80" y="10" width="60"><Size height="30"><ID type="url">B</ID></Size></Position></Object>
<Object><Position x="10" y="50" width="60"><Size height="30"><ID type="url">C</ID></Size></Position></Object>
<Object><Position x="80" y="50" width="60"><Size height="30"><ID type="url">D</ID></Size></Position></Object>
</AllowedLayout>
</Policy>
```

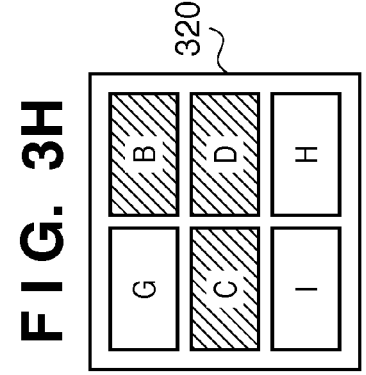

FIG. 3E

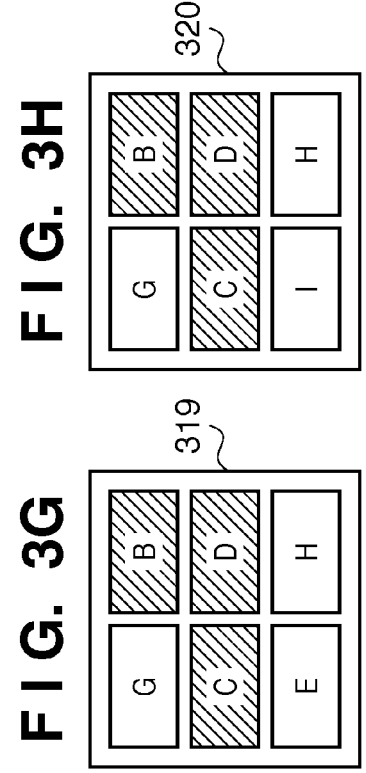

FIG. 3F

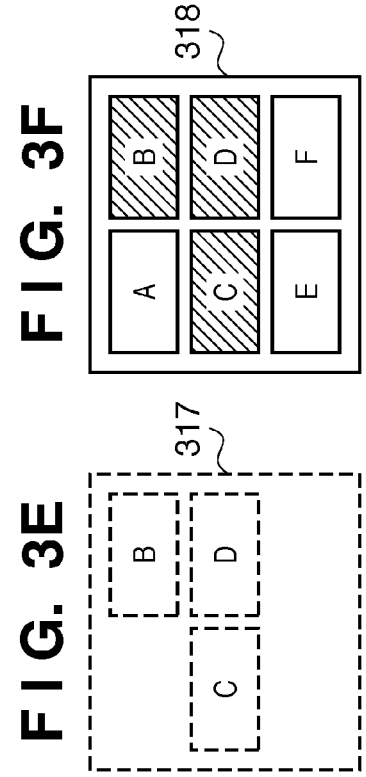

```
<Policy>
  <AllowedLayout Paper="A4" unit="px">
    <Object><Area point="(80,10),(140,10),(80,40),(140,10)"><ID type="url">B</ID></Area></Object>
    <Object><Area point="(10,50),(70,50),(10,80),(70,80)"><ID type="url">C</ID></Area></Object>
    <Object><Area point="(80,50),(140,50),(80,80),(140,80)"><ID type="url">D</ID></Area></Object>
  </AllowedLayout>
</Policy>
```

FIG. 3J

```
<Policy>
  <AllowedLayout Paper="A4" unit="px">
    <Object>
      <Position x="10" y="10"><Size height="30" width="60"><ID type="url">A</ID><Rotate></Rotate></Size></Position>
    </Object>
    <Object><Position x="10" y="50"><Size height="30" width="60"><ID type="url">C</ID></Size></Position></Object>
  </AllowedLayout>
</Policy>
```

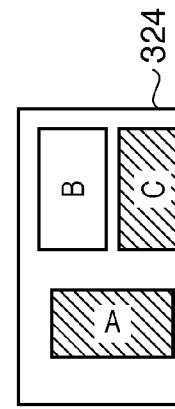

FIG. 3K

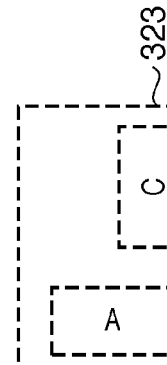

```
<Policy>
<AllowedLayout Paper="A4" unit="px">
<Page>
<Object><Position x="10" y="10"><Size height="30" width="60"><ID type="any"></ID></Size></Position></Object>
<Object><Position x="80" y="10"><Size height="30" width="60"><ID type="url">B</ID></Size></Position></Object>
<Object><Position x="10" y="50"><Size height="30" width="60"><ID type="url">C</ID></Size></Position></Object>
<Object><Position x="80" y="50"><Size height="30" width="60"><ID type="url">D</ID></Size></Position></Object>
<Object><Position x="10" y="90"><Size height="30" width="60"><ID type="url">E</ID></Size></Position></Object>
<Object><Position x="80" y="90"><Size height="30" width="60"><ID type="url">F</ID></Size></Position></Object>
</Page>
</AllowedLayout>
</Policy>
```

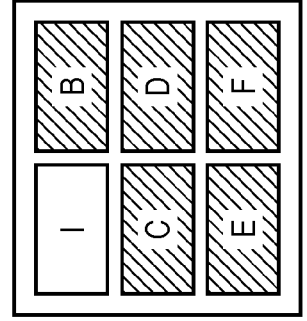

FIG. 4B

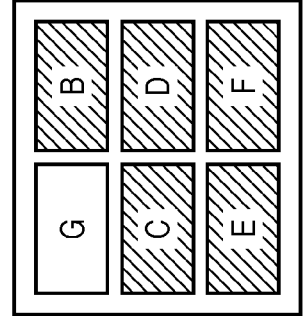

FIG. 4C

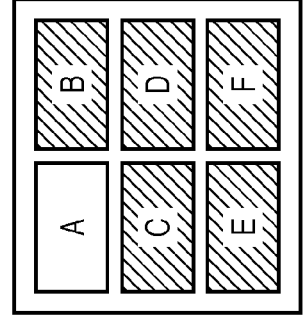

FIG. 4D

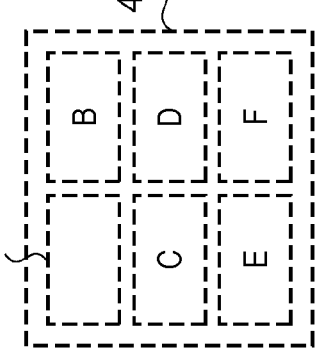

FIG. 4E

```
<Policy>
  <AllowedLayout Paper="A4" unit="px">
    <Object><Position x="80" y="50"><Size height="30" width="60"><ID type="url">D</ID></Size></Position></Object>
    <Object> ~409
    <Position x_min="10" x_max="80" y="90"><Size height="30" width="60"><ID type="url">E</ID></Size></Position>
    </Object>
  </AllowedLayout>
</Policy>
```

FIG. 4J
```
<Policy>
  <AllowedLayout Paper="A4" unit="px">
    <Object><Position x="80" y="50"><Size height="30" width="60"><ID type="url">D</ID></Size></Position></Object>
    <Object> ~415
      <Area x_min="10" x_max="140" y_min="90" y_max="120">
        <Size height_min="20" height_max="60" width_min="40" width_max="70"><ID type="url">E</ID></Size>
      </Area>
    </Object>
  </AllowedLayout>
</Policy>
```
414
FIG. 4K
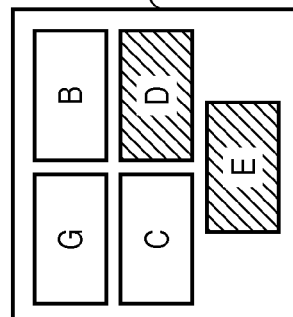
416, 417
FIG. 4L
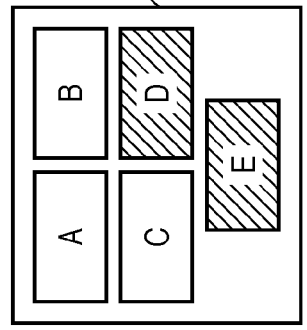
418
FIG. 4M
419

FIG. 5A

```
<Header>
<AllowedLayout Paper="A4" unit="px">
 <Page>
  <Object><Position x="10" y="10"><Size height="30" width="80"><ID type="hash">d9a3fdfc</ID></Size></Position></Object>
  <Object><Position x="10" y="50"><Size height="30" width="80"><ID type="hash">17c47ed0</ID></Size></Position></Object>
  <Object><Position x="10" y="90"><Size height="30" width="30"><ID type="hash">5d2eb873</ID></Size></Position></Object>
  <Object><Position x="40" y="90"><Size height="30" width="30"><ID type="hash">fdfc7ca1</ID></Size></Position></Object>
 </Page>
</AllowedLayout>
</Header>

<Document>
<Paper size="A4"/>
 <Page>
  <Object><Position x="10" y="10"><Size height="30" width="80"><File>Address.ps</File></Size></Position></Object>
  <Object><Position x="10" y="50"><Size height="30" width="80"><File>Message.ps</File></Size></Position></Object>
  <Object><Position x="10" y="90"><Size height="30" width="30"><File>AD.ps</File></Size></Position></Object>
  <Object><Position x="40" y="90"><Size height="30" width="30"><File>AD.jpg</File></Size></Position></Object>
 </Page>
</Document>
```

```
<Policy>
<AllowedLayout type="hash">4bdcd480</AllowedLayout>
</Policy>
```

1302

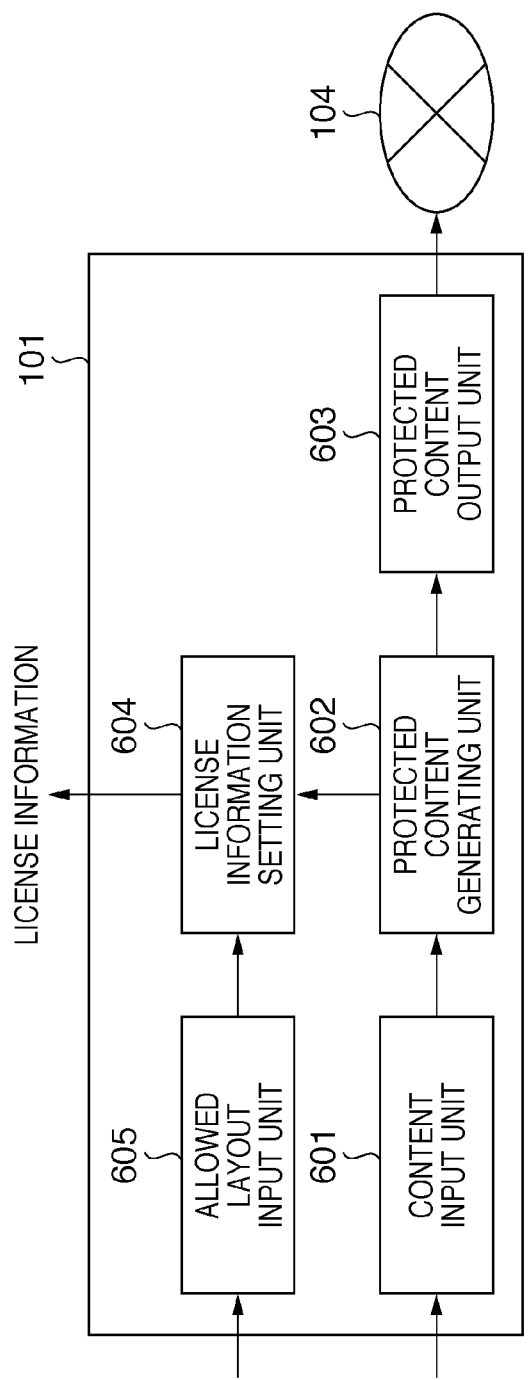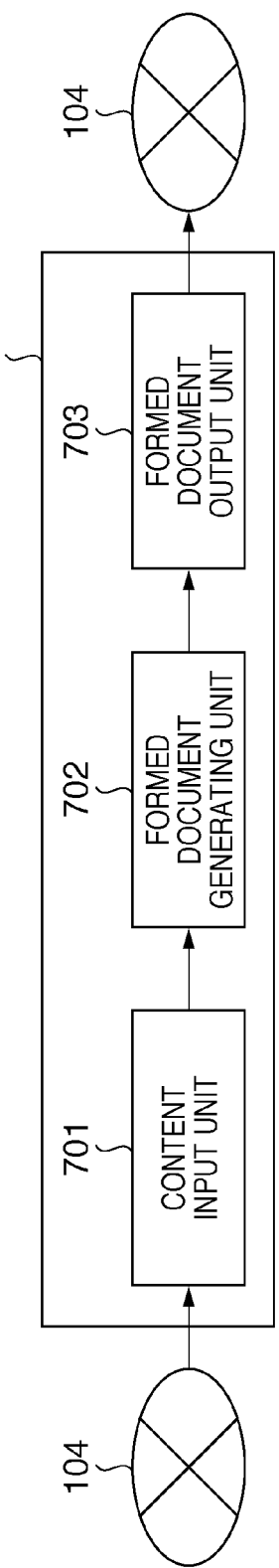

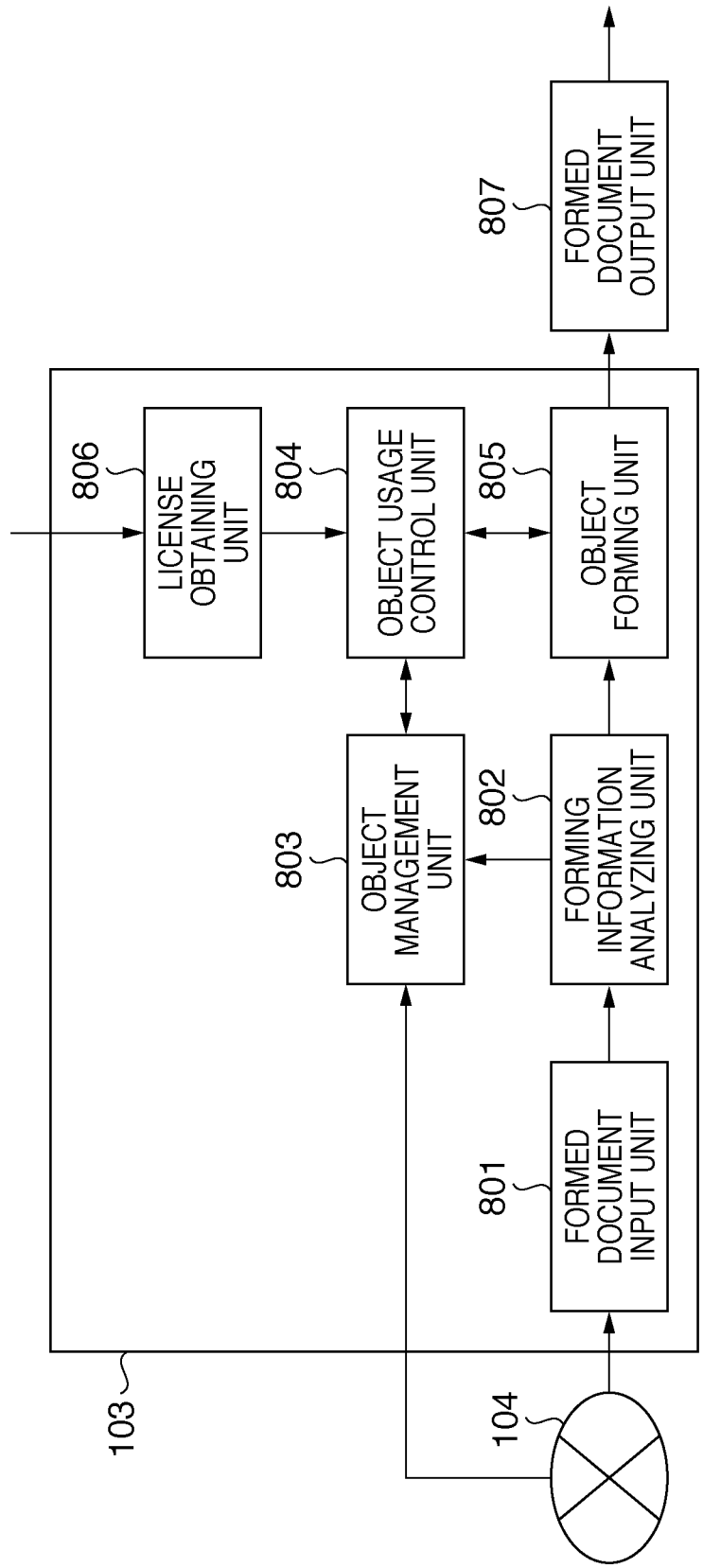

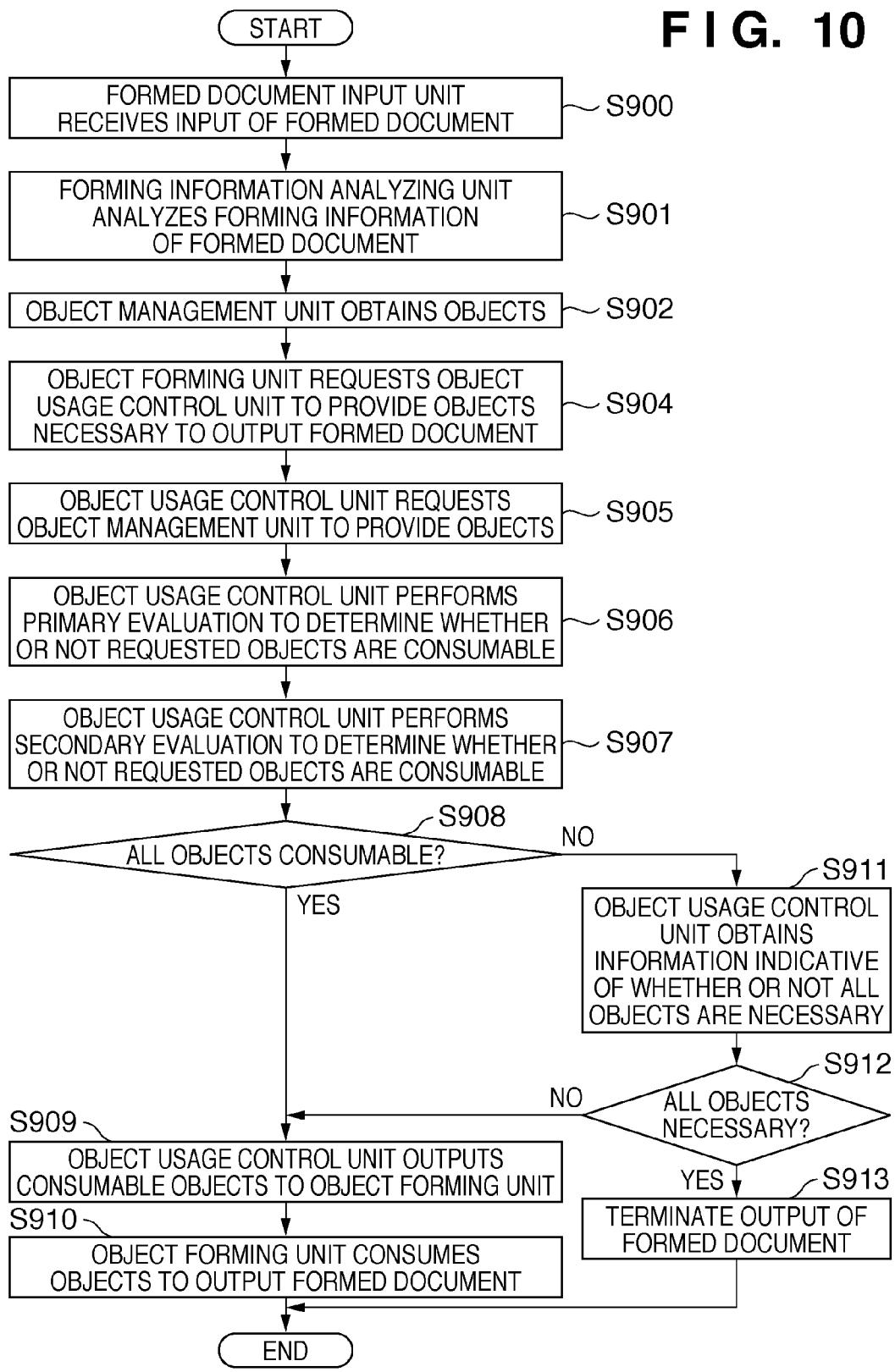

FIG. 14

```
<Signature>
 <Key type="url">http://X.com/VerifyKey</Key>
 <ID type="url">Layout.xml</ID>
 <Value>792afd0a</Value>
</Signature>
```

FIG. 15

```
<Policy>
 <AllowedLayout Paper="A4" unit="px">
  <Page>
   <Object><Position x="10" y="10"><Size height="30" width="60">
    <AlphaChannel Value=0><ID type="url">A</ID></AlphaChannel>
   </Size></Position></Object>
   <Object><Position x="80" y="10"><Size height="30" width="60">
    <Layer Value="Max"><ID type="url">B</ID></Size></Position></Object>
  </Page>
 </AllowedLayout>
</Policy>
```

INFORMATION PROCESSING APPARATUS AND INFORMATION PROCESSING METHOD

BACKGROUND OF THE INVENTION

1. Field of the Invention

The present invention relates to usage control of content that is used as objects of a formed document.

2. Description of the Related Art

[Formed Document]

Document data in a format that represents a document in a combination of objects and forming information thereof (hereinafter referred to as a "formed document") has been utilized in recent years. As used herein, "objects" refer to content items serving as components that constitute a document, that is, data items written in formats such as JPEG, PDF, Tiff and PostScript®. "Forming information" refers to data that specifies objects serving as components of a formed document, and in which the relationship between the objects and the formed document is written. When describing that "forming information specifies objects to be output" in the explanation given hereunder, it indicates that forming information specifies objects so that the objects are output as components.

For example, forming information specifies the coordinates and size of each object when outputting a formed document. A data file in which forming information is written (hereinafter referred to as a "layout file") and data files of objects are archived and may be managed collectively or separately.

When forming information and objects are managed collectively, an output apparatus forms and outputs the objects in accordance with the forming information extracted from a formed document. On the other hand, when forming information and objects are managed separately, an output apparatus refers to object identifiers, such as URLs (uniform resource locators), that are written in the forming information, obtains objects, and forms and outputs the obtained objects based on the forming information.

Because each object is specified to be output in accordance with the forming information as described above, it is possible to create and edit document data without changing data of the objects.

A page description language (PDL) called personalized print markup language (PPML) is an example of a formed document. PPML describes forming information in an XML (extensible markup language) format and locates objects within a page in accordance with the forming information. With PPML, it is possible to specify objects internally (internal data) and/or externally (external data). Objects that are specified internally (hereinafter referred to as "internally specified objects") are embedded within a layout file. Objects that are specified externally (hereinafter referred to as "externally specified objects") are specified with identifiers such as URLs.

It goes without saying that data files of externally specified objects and a layout file are archived and may be managed collectively or separately. When externally specified objects and a layout file are managed collectively, an output apparatus forms and outputs the objects in accordance with the forming information of the layout file extracted from a formed document. On the other hand, when externally specified objects and a layout file are managed separately, an output apparatus refers to object identifiers, such as URLs, that are written in the forming information of the layout file, obtains objects, and forms and outputs the obtained objects based on the forming information.

[DRM]

Digital rights management (DRM) is a technology used to manage the copyrights of content as typified by digital data such as music, moving images and still images (see Japanese patent No. 3738020). With this DRM technology, a policy in which usage conditions for respective content are written is set, and the content can be used only when the policy is satisfied.

A policy is represented in a combination of a plurality of usage conditions, and each usage condition includes condition items and condition values. "Condition items" are items that are examined for the usage control of content. "Condition values" are criterion values that are used to determine acceptance or non-acceptance in the examinations. For example, when a condition item is "authorized user", its condition value is a value that identifies a user A or user B. As the condition items, for example, the period of usage of content, the frequency of usage, usage location and so on can be used.

An example of an embodiment of this DRM technology will be described below. In the following explanations, content protected by DRM is referred to as "protected content", and content that is not protected by DRM is (explicitly) referred to as "non-protected content".

A content administrator (hereinafter referred to as an "administrator") generates a license including a policy in which encrypted content obtained by encrypting content, a decryption key for decrypting the encrypted content, and usage conditions for the content are set, and distributes protected content in which meta information for obtaining the license is added to the encrypted content.

A person who obtained the protected content (hereinafter referred to as a "user") requests the license using the meta information included in the protected content. The administrator issues the license to authorized users and users who have paid therefor.

A user who obtained the license uses the decryption key included in the license in accordance with the policy and consumes the protected content. As used herein, "the consumption of content" refers to a process in which data such as images and moving images is processed and output to a screen or in the form of printouts, a process in which content is copied or edited, and so on. To consume protected content, the usage environment (date and time of usage, user, etc.) of the content and the usage conditions written in the policy are examined to perform a policy evaluation for determining whether or not the protected content can be consumed.

According to another embodiment of the DRM, for example, the distribution of protected content is controlled such that the protected content is distributed only to terminals within a network as typified by a cell phone network, and the usage of the protected content by the terminals is controlled in accordance with the policy set in the protected content.

As described above, it is possible to control the usage of objects by protecting the objects with DRM. However, in the case of a formed document, objects are output in accordance with a layout written in the forming information, and thus output is possible by editing the forming information or changing the layout of the objects. Particularly when laying out and outputting a plurality of objects, a problem arises in that the layout differs significantly from the layout intended by the content administrator.

SUMMARY OF THE INVENTION

It is an object of the present invention to make it possible to control the usage of objects in accordance with a layout intended by the content administrator.

According to one aspect of the present invention, an information processing apparatus comprises:

an input unit adapted to input forming information, a plurality of objects and usage conditions for the plurality of objects, the usage conditions including layout information that is generated from the forming information;

a control unit adapted to control usage permission of the forming information and the plurality of objects based on the usage conditions; and an output unit adapted to lay out and output the plurality of objects for which usage is permitted, in accordance with the forming information for which usage is permitted.

According to another aspect of the present invention, an information processing method comprises the steps of:

inputting forming information, a plurality of objects and usage conditions for the plurality of objects, the usage conditions including layout information that is generated from the forming information;

controlling usage permission of the forming information and the plurality of objects based on the usage conditions; and laying out and outputting the plurality of objects for which usage is permitted, in accordance with the forming information for which usage is permitted.

According to still another aspect of the present invention, a computer-readable storage medium in which a computer program is recorded, wherein the computer program causes a computer to function as an information processing apparatus includes:

an input unit adapted to input forming information, a plurality of objects and usage conditions for the plurality of objects, the usage conditions including layout information that is generated from the forming information;

a control unit adapted to control usage permission of the forming information and the plurality of objects based on the usage conditions; and an output unit adapted to lay out and output the plurality of objects for which usage is permitted, in accordance with the forming information for which usage is permitted.

Further features of the present invention will become apparent from the following description of exemplary embodiments with reference to the attached drawings.

BRIEF DESCRIPTION OF THE DRAWINGS

FIG. 2B is a diagram illustrating a layout file.

FIGS. 3A to 3L are diagrams illustrating allowed layouts.

FIGS. 4A to 4M are diagrams illustrating allowed layouts that are flexible.

FIGS. 5A and 5B are diagrams showing an example in which an allowed layout is written in a layout file.

FIG. 7 is a block diagram showing an example of a function configuration of the protected content generating apparatus.

FIG. 8 is a block diagram showing an example of a function configuration of the formed document generating apparatus.

FIG. 9 is a block diagram showing an example of a function configuration of the formed document output apparatus.

FIG. 10 is a flowchart showing an example of a processing procedure performed by the formed document output apparatus.

FIG. 14 is a diagram showing an example of a signature.

FIG. 15 is a diagram showing an example of a policy in which the transparency of an object and the overlap between objects are added.

DESCRIPTION OF THE EMBODIMENTS

Hereinafter, an information process according to an embodiment of the present invention will be described with reference to the accompanying drawings.

Embodiment 1

[System Configuration]

Figure 1:
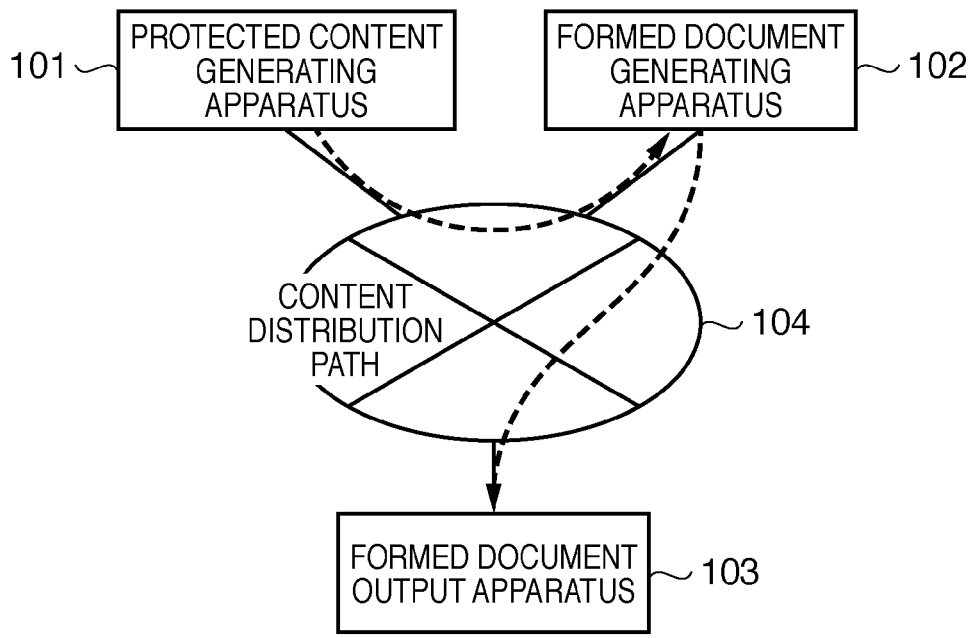
FIG. 1 is a diagram showing the distribution of protected content according to an embodiment.

FIG. 1 is a diagram showing the distribution of protected content according to an embodiment.

A protected content generating apparatus 101, a formed document generating apparatus 102 and a formed document output apparatus 103 transmit/receive electronic data to/from each other via a content distribution path 104. As used herein, "content" refers to electronic data including digital information such as texts, documents, images and videos.

As the content distribution path 104, for example, a computer network as typified by the Internet is assumed to be used, but it is also possible to use a dedicated network configured with devices such as cell phones, or a physical path using recording media such as CD-ROMs and DVD-ROMs.

The transmission/reception of electronic data is not limited to a configuration in which the protected content generating apparatus 101, the formed document generating apparatus 102 and the formed document output apparatus 103 directly transmit/receive electronic data to/from each other, and other apparatuses may exist among these apparatuses. Furthermore, a distribution path connecting the protected content generating apparatus 101 and the formed document generating apparatus 102 and a distribution path connecting the formed document generating apparatus 102 and the formed document output apparatus 103 may be distribution paths of different configurations.

The protected content generating apparatus 101 generates protected content that is used/controlled in accordance with a policy. A policy for protected content includes usage conditions for specifying a layout in which protected content is allowed and specified to be output (hereinafter referred to as an "allowed layout"). The policy for protected content can, of course, include general usage conditions such as the frequency of usage and the expiration date in addition to the usage conditions for specifying an allowed layout. The allowed layout will be described later in detail.

As a method for controlling the usage of protected content, a method in which usage control is performed by managing a decryption key for encrypted content, a method in which usage control is performed by using devices capable of controlling user access such as cell phones, and so on are used. An example will be described below in which the usage of protected content is controlled by encryption.

The formed document generating apparatus 102 forms protected content generated by the protected content generating apparatus 101 and generates a formed document to be output. FIG. 1 shows an example in which the protected content generating apparatus 101 and the formed document generating apparatus 102 are connected one-to-one. However, the present invention is not limited to a one-to-one connection, and the formed document generating apparatus 102 can receive protected content from a plurality of protected content generating apparatuses 101. The formed document will be described later in detail.

The formed document output apparatus 103 outputs the formed document generated by the formed document generating apparatus 102 by, for example, printing it, displaying it on a screen, or the like.

[Formed Document]

"Formed document" refers to a document that is written in a combination of objects and forming information thereof. When outputting the formed document, the objects are formed and outputted in accordance with the forming information. The objects may be protected content or non-protected content. The forming information is information that provides instructions on how to form and output the objects. In the forming information, objects to be formed, the position and size of the objects, and transformation specification such as transparency and rotation are written in any combination thereof. In the case of an object being a moving image or music, frame information and time information, such as "from the first frame to the 1800th frame" and "from the first 10 to 20 seconds", are written as forming information.

In a formed document, a data file in which forming information is primarily written is called a "layout file". To put it differently, forming information for objects is written in a layout file, and thereby a formed document is represented.

When printing a formed document or outputting it on a screen, the objects are formed in accordance with the forming information written in a layout file. As used herein, "to form" means to locate (lay out) objects at prescribed positions of a page.

Figure 2A:
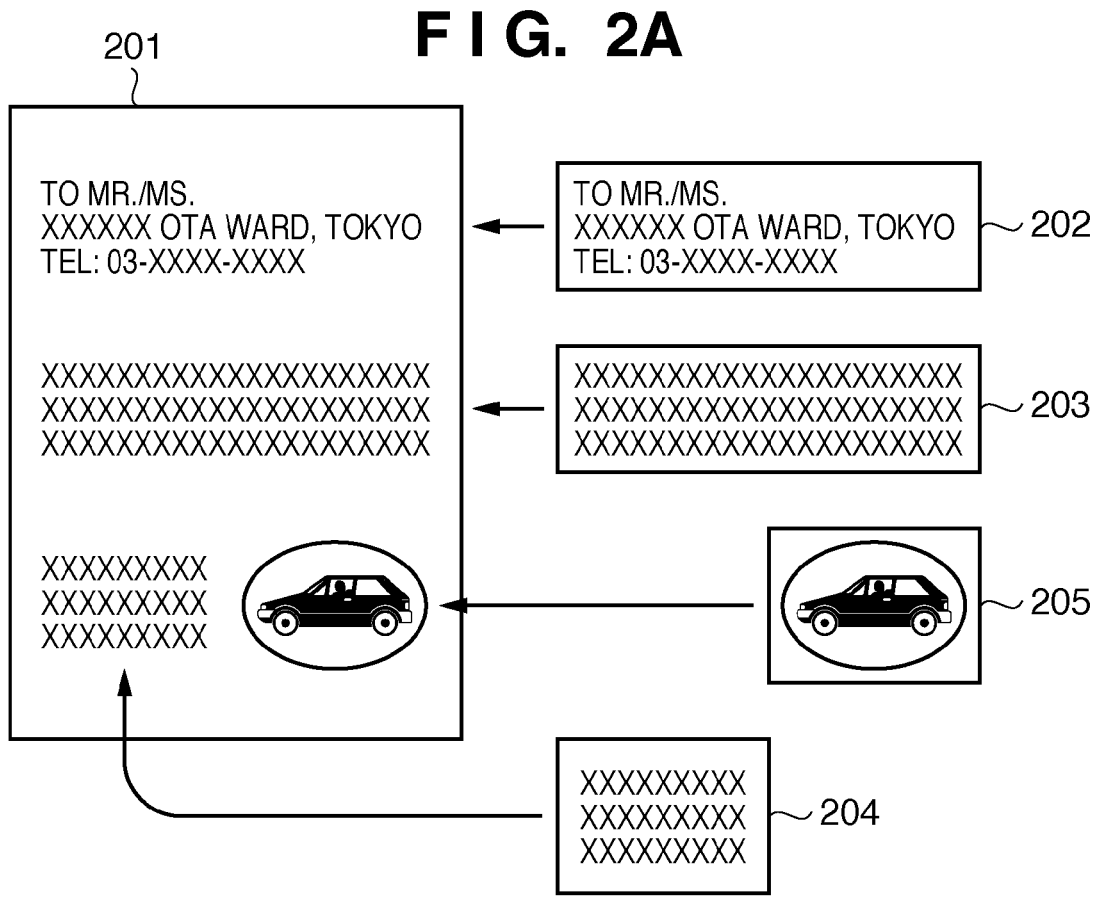
FIG. 2A is a diagram illustrating a formed document.

FIG. 2A is a diagram illustrating a formed document. FIG. 2B is a diagram illustrating a layout file.

A formed document 201 includes an object 202 (file name: Address.ps), an object 203 (file name: Message.ps), an object 204 (file name: AD.ps), and an object 205 (file name: AD.jpg). Forming information for these objects is written in a layout file 206 (file name: Layout.xml). The layout file 206 shown in FIG. 2B shows an example of forming information written in an XML format.

A <Page> tag in the layout file 206 defines a page, and objects constituting the page are specified by <Object> tags within the <Page> tag. In a <File> tag included in each <Object> tag, identification information of an object is written. In a <Position> tag and a <Size> tag, which position on the page the object is to be located and which size the object is to be formed are written. In a <Paper> tag, page size of the document is written. In FIG. 2B, an example is shown in which the page size is set to A4 size.

The formed document 201 shown in FIG. 2A includes protected content and non-protected content. For example, the objects 202 and 205 are protected content, and others are non-protected content.

[Allowed Layout]

"Allowed layout" refers to data that represents feature amounts of forming information that specifies objects to be output. That is, when outputting a formed document, the consumption or non-consumption of objects is determined through a comparison between the allowed layout and forming information. The allowed layout is represented by setting a condition value to at least one of the condition items such as the identifiers, positions, sizes and transformation specifications of the objects specified to be outputted by forming information, and combining the usage conditions of the objects. The condition value can be a fixed or variable value.

FIGS. 3A to 3L are diagrams illustrating allowed layouts.

A policy 301 shown in FIG. 3A shows an example of a policy that is written in XML and is set for protected content, and FIG. 3B shows an allowed layout 308 for protected content.

An <AllowedLayout> tag included in a <Policy> tag defines an allowed layout for protected content. A <Paper> attribute value within the <AllowedLayout> tag specifies the size of recording paper to which the protected content can be output. A <unit> attribute value specifies coordinates described later or a unit of size. By including <Object> tags in a <Page> tag within the <AllowedLayout> tag, the configuration of objects that can be specified to be output is defined.

An <ID> tag included in each <Object> tag defines the identifier of an object. As the identifier, an URL is written when the <type> attribute value of the <ID> tag is "url", and a hash value is written when the <type> attribute value is "hash". That is, in the policy 301, URLs are written as the identifiers of objects A, B and C, and hash values for data files are written as the identifiers of objects D, E and F.

A <Position> tag and a <Size> tag included in each <Object> tag define which position on the page the object specified by the <ID> tag is to be located and which size the object is to be formed.

The allowed layout 308 shown in FIG. 3B shows an allowed layout that is defined with <Object> tags 302 to 307. When the allowed layout 308 is defined, objects A to F are allowed to be consumed only in a formed document that specifies an object configuration 315 shown in FIG. 3C to be output.

An allowed layout 317 shown in FIG. 3E shows an allowed layout that is defined with three <Object> tags that correspond to objects B, C and D included in a policy 316 shown in FIG. 3D. When the allowed layout 317 is defined, objects other than the objects B, C and D can be located in any position. Accordingly, the consumption of the objects B, C and D is allowed for a formed document that specifies an object configuration 318 (shown in FIG. 3F) that is similar to the object configuration 315 to be output. The consumption of the objects B, C and D is also allowed for a formed document that specifies an object configuration 319 (shown in FIG. 3G) that specifies objects G and H to be output instead of the objects A and F as well as for a formed document that specifies an object configuration 320 (shown in FIG. 3H) in which the object E is replaced by an object I.

The administrator can perform layout control only for specific objects by defining the allowed layout 317 as a condition value in the protected content. For example, when merge printing is performed in which an address record recorded in a database serving as an object is inserted into each page, an allowed layout for the address record can be defined.

In the policies 301 and 316, the position and size of each object is defined using a <Position> tag and a <Size> tag, but it is also possible to specify the end points of a region that forms an object (hereinafter referred to as a "forming region"). A policy 321 shown in FIG. 3I shows an example in which the end points of a forming region are defined with an <Area> tag.

In a policy 322 shown in FIG. 3J, an <Object> tag includes a <Rotate> tag. The <Rotate> tag defines the rotation of an object specified by the <ID> tag with its attribute value. That is, as shown in an allowed layout 323 (shown in FIG. 3K), transformation specification that causes an object to be rotated to the right for output is defined.

When the allowed layout 323 is defined, objects other than objects A and C can be located in any position, but the object A should be rotated 90 degrees to the right as shown in an object configuration 324 (shown in FIG. 3L).

The allowed layouts shown in FIGS. 3A to 3L show examples in which condition items, that is, the identifier, position, size, and optionally transformation specification of an object are defined as condition values. However, a more flexible allowed layout can be defined by defining a condition value or a condition value having a range in at least one condition item of the identifier, position, size, and optionally transformation specification of an object.

FIGS. 4A to 4M are diagrams illustrating flexible allowed layouts.

In an <Object> tag 402 that is included in a policy 401 shown in FIG. 4A and corresponds to a forming region 404 of an allowed layout 403 shown in FIG. 4B, an <ID> tag exists in which "any" is set as the attribute value. That is, any object can be specified to be outputted as long as the object satisfies the position and size of the forming region 404. Accordingly, the consumption of the protected content defined by the allowed layout 403 is allowed for, for example, formed documents that respectively specify object configurations 405, 406 and 407 shown in FIGS. 4C, 4D and 4E to be output.

Figures 4F, 4G, 4H, 4I:
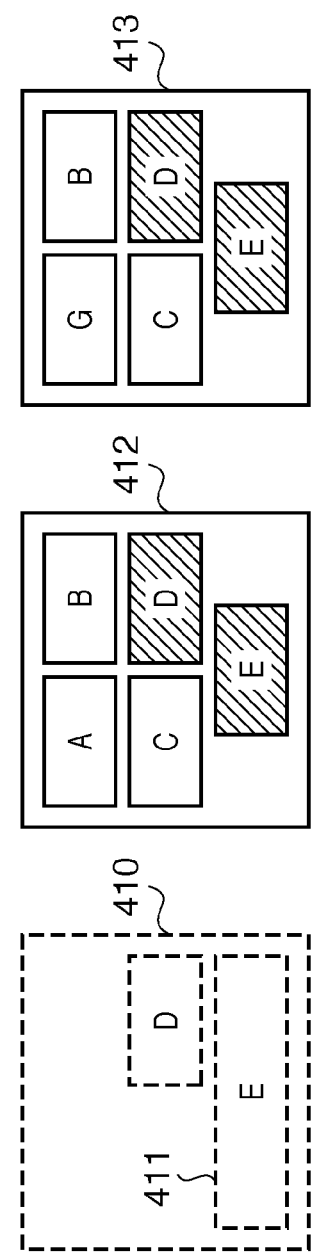

In an <Object> tag 409 that is included in a policy 408 shown in FIG. 4F and corresponds to a forming region 411 of an object E of an allowed layout 410 shown in FIG. 4G, a <Position> tag exists that has attribute values x_min and x_max. That is, an x coordinate located at the upper left of the forming region 411 is defined to be in a range from x_min to x_max (10 to 80 in FIGS. 4F and 4G), and thus the object E can be located in any position within that range of the forming region 411. Accordingly, the consumption of the protected content defined by the allowed layout 403 is allowed for, for example, formed documents that respectively specify object configurations 412 and 413 shown in FIGS. 4H and 4I.

In an <Object> tag 415 that is included in a policy 414 shown in FIG. 4J and corresponds to a forming region 417 of an object E of an allowed layout 416 shown in FIG. 4K, an <Area> tag exists that has attribute values x_min, x_max, y_min and y_max. A <Size> tag that has attribute values height_min, height_max, width_min and width_max also exists. That is, the object E can be located at any position as long as it is within the forming region 417 having a range that is defined by the coordinates located at the upper left (x_min, y_min) and the coordinates located at the lower right (x_max, y_max) and has an area ranging from the minimum height_min×width_min to the maximum height_max×width_max. Accordingly, the consumption of the protected content defined by the allowed layout 416 is allowed for, for example, formed documents that respectively specify object configurations 418 and 419 shown in FIGS. 4L and 4M.

By defining a flexible layout as described above, it is also possible to cope with a situation where it is necessary to adjust the layout to improve the resolution of the objects or the location with respective to other objects.

The foregoing described an example in which an allowed layout is written in a policy set for protected object. However, the allowed layout may be written in a layout file.

FIGS. 5A and 5B are diagrams showing an example in which an allowed layout is written in a layout file 1301, that is, an example in which the description of the allowed layout 308 shown in FIGS. 3A to 3C is added to the description of the layout file 206 shown in FIG. 2B. A <Header> tag included in the layout file 1301 shown in FIG. 5A defines the property information of a formed document. In other words, the information written in the <Header> tag does not directly affect the formation of objects in a formed document. On the other hand, a <Document> tag defines (declares) forming information for objects in the formed document. Accordingly, when outputting the formed document, the objects are formed in accordance with the forming information defined in the <Document> tag, and the formed document is output.

Meanwhile, in an <AllowedLayout> tag included in a policy 1302 for protected content shown in FIG. 5B, a hash value of the allowed layout defined in the <AllowedLayout> tag included in the layout file 1301 is defined. At this time, it is desirable to generate a hash value after normalization processes, such as unification of a character code, unification of uppercase or lowercase and deletion of unnecessary spaces, are performed on the description of the allowed layout.

When outputting a formed document, a hash value for the allowed layout written in the <AllowedLayout> tag of the layout file 1301 is generated, and the generated hash value is compared with the hash value defined in the <AllowedLayout> tag of the policy 1302. Then, it is determined whether or not the forming information written in the <Document> tag satisfies the allowed layout defined in the <AllowedLayout> tag to determine the consumption or non-consumption of the objects in the formed document.

By employing the method for writing an allowed layout and a policy as shown in FIGS. 5A and 5B, the amount of information of an allowed layout that should be written in a policy can be compressed.

[Apparatus Configuration]

Figure 6:
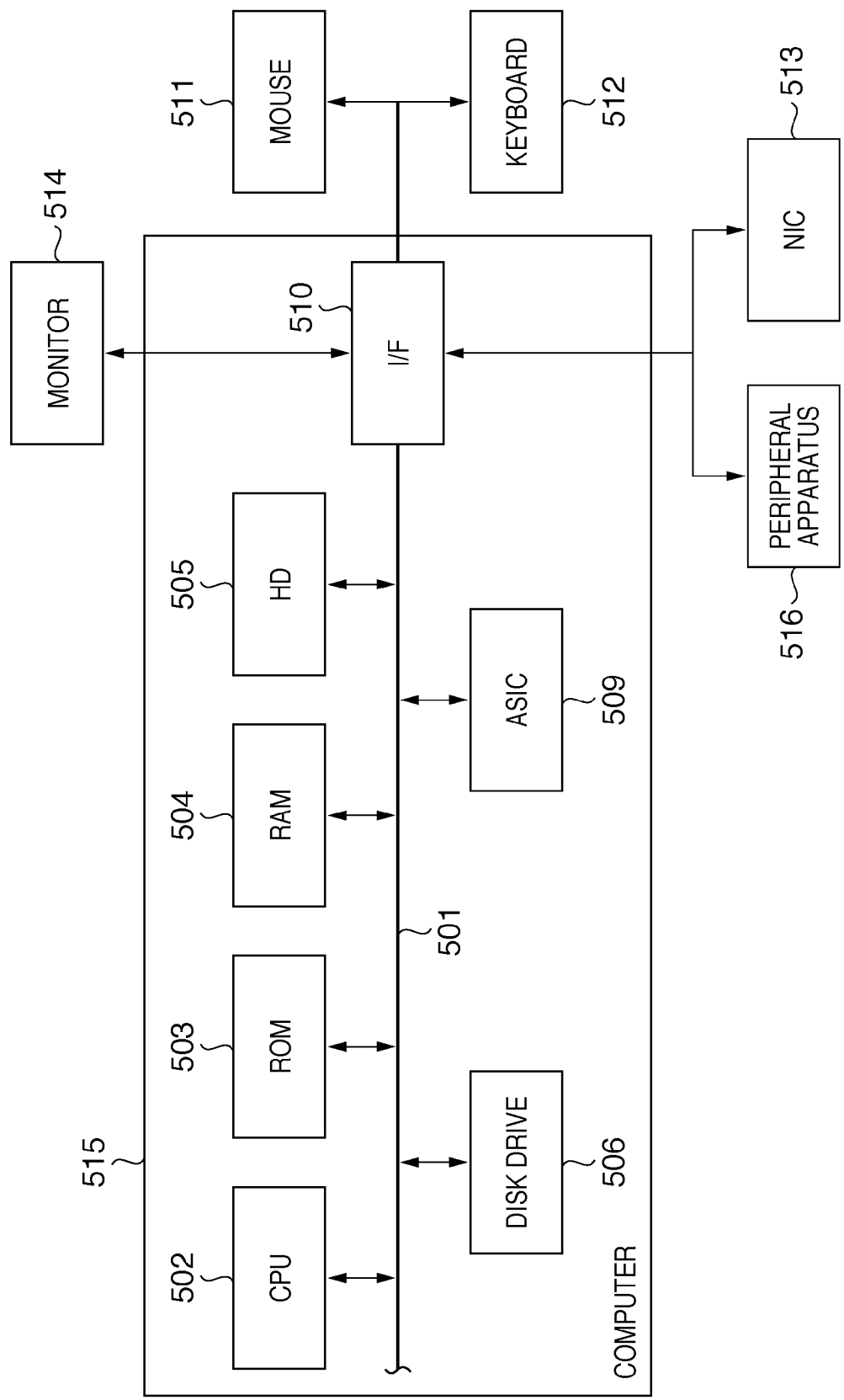
FIG. 6 is a diagram illustrating an example of a configuration of a computer and a peripheral apparatus that can be used as a protected content generating apparatus, a formed document generating apparatus and a formed document output apparatus.

FIG. 6 is a diagram illustrating an example of a configuration of a computer 515 and a peripheral apparatus that can be used as the protected content generating apparatus 101, the formed document generating apparatus 102 and the formed document output apparatus 103.

A CPU 502 executes an operating system (OS) and various software that are stored in a ROM 503 and on a hard disk (HD) 505 using a RAM 504 as the working memory, and controls constituent elements described later via a system bus 501.

An ASIC 509 processes data to be processed by the computer 515 at a high speed instead of the CPU 502. For example, the ASIC 509 handles an encryption process, a raster image process (RIP) and so on.

A disk drive 506 can be a drive for storage media such as CDs and DVDs. A peripheral apparatus 516 can be a memory card reader/writer, scanner, printer or the like. The CPU 502 can load software or data from a storage medium or memory card and store it on the HD 505, or can write data or the like stored on the HD 505 onto a memory card. The CPU 502 can also obtain image data from an original document with a scanner, or can prompt a printer to print various documents including formed documents.

An interface (I/F) 510 connects the computer 515 to various peripheral apparatuses. The CPU 502 displays a user interface (UI) on a monitor 514. The user operates the UI with a mouse 511 or a keyboard 512 to input various instructions to the computer 515.

A network interface card (NIC) 513 is an interface for a network. The CPU 502 can obtain software or data from a server apparatus on a network and store it on the HD 505, or can transmit data or the like stored on the HD 505 to the server apparatus.

The CPU 502 can also display data stored on a storage medium, a memory card or the HD 505 as well as data obtained from the server apparatus on the monitor 514. The data includes a formed document, a layout file for a formed document, protected content, non-protected content and so on.

Protected Content Generating Apparatus

FIG. 7 is a block diagram illustrating an example of a function configuration of the protected content generating apparatus 101.

A content input unit 601 receives an input of digital data serving as content from the disk drive 506, the peripheral apparatus 516, the server apparatus or the like in response to an instruction from the user.

A protected content generating unit 602 converts the content input by the content input unit 601 to protected content. That is, the protected content generating unit 602 encrypts the content and generates protected content in which meta information necessary for obtaining a license is added. The protected content generating unit 602 outputs key information to a license information setting unit 604 and the protected content to a protected content output unit 603.

The protected content output unit 603 outputs the protected content inputted from the protected content generating unit 602 to the content distribution path 104. More specifically, the protected content may be output to a network via the NIC 513, or may be recorded onto a storage medium such as a CD-R or DVD-R.

The allowed layout input unit 605 receives an input of definition information indicative of the identifier, position, size, and optionally transformation specification of objects defining an allowed layout. The definition information may be input by the user of the computer 515 using, for example, a text editor, or may be generated by processing a sample document with the computer.

A license information setting unit 604 sets the allowed layout input by the allowed layout input unit 605 in a policy for the protected content, and adds the key information output by the protected content generating unit 602 to the policy to generate license information. At this time, the license information is encrypted so that the license information can be decoded only by licensed users or apparatuses. Alternatively, the license information may be transmitted to an apparatus that safely manages the license information, or may be written in a region of a storage medium that is not usually used for data readout. It is of course possible to set not only an allowed layout, but also condition items, such as the expiration date and the frequency of usage, in the policy for protected content.

Formed Document Generating Apparatus

FIG. 8 is a block diagram illustrating an example of a function configuration of the formed document generation apparatus 102.

A content input unit 701 receives an input of objects from a network or storage medium in response to an instruction from the user. The objects received by the content input unit 701 may be protected content generated by the protected content generating apparatus 101 or non-protected content. Alternatively, only object identifiers as typified by URLs may be inputted.

A formed document generating unit 702 generates a formed document by writing the forming information of the objects inputted by the content input unit 701 in accordance with an instruction from the user. The formed document generating unit 702 can be, for example, word-processing software. The generated formed document is then output. At this time, as stated earlier, the layout file and the data files of the objects may be managed collectively or separately.

A formed document output unit 703 outputs the formed document input from the formed document generating unit 702 to the content distribution path 104. More specifically, the protected content may be output to a network via the NIC 513, or may be recorded on a storage medium such as a CD-R or DVD-R.

The foregoing illustrated an example in which the content input unit 701 inputs only objects. However, an existing formed document may be input. In this case, the formed document can be edited by changing the forming information included in the existing formed document, or making a change, addition or deletion on the objects.

Formed Document Output Apparatus

FIG. 9 is a block diagram illustrating an example of a function configuration of the formed document output apparatus 103.

A formed document input unit 801 receives an input of the formed document generated by the formed document generating apparatus 102 via a network or storage medium.

A forming information analyzing unit 802 analyzes the forming information of the formed document input by the formed document input unit 801. If object identifiers are written in the forming information, the identifiers are output to an object management unit 803. If objects are managed collectively with the formed document, the data files of the objects are extracted and output to the object management unit 803. Also, the forming information is output to an object forming unit 805.

If object identifiers are input from the forming information analyzing unit 802, the object management unit 803 obtains objects that are specified by the identifiers from a network or storage medium, and stores them on, for example, the HD 505. If data files of objects are inputted, the object management unit 803 stores the data files on the HD 505. Then, the object management unit 803 reads objects that are requested by an object usage control unit 804 from the HD 505, and outputs them to the object usage control unit 804.

An object forming unit 805 requests the object usage control unit 804 to provide objects necessary to output a formed document. If objects are input from the object usage control unit 804 in response to this request, the object forming unit 805 forms the objects in accordance with the forming information and outputs a formed document.

The object usage control unit 804 obtains objects requested by the object forming unit 805 from the object management unit 803. In the case where the obtained objects are non-protected content, the objects are output to the object forming unit 805. In the case where the obtained objects are protected content, meta information having been added to the protected content is outputted to a license obtaining unit 806.

The license obtaining unit 806 obtains license information output by the protected content generating apparatus 101 using the meta information input from the object usage control unit 804, and outputs the obtained license information to the object usage control unit 804.

The object usage control unit 804 evaluates the policy included in the license information and determines whether or not the protected content can be used. If it is determined that the protected content can be used as a result of the evaluation of the policy, the protected content is decoded using the key information included in the license information, and the decoded content (objects) is output to the object forming unit 805. Conversely, if it is determined that the protected content cannot be used as a result of the evaluation of the policy (or if the license obtaining unit 806 cannot obtain the license information), the object usage control unit 804 provides a notification indicating that the protected content cannot be used to the object forming unit 805, and terminates the output of a formed document.

The object usage control unit 804 controls the consumption of the protected content in this manner. That is, if it can obtain license information for all of the protected content, and determines that the protected content can be used, the object usage control unit 804 performs control to output a formed document. If the object usage control unit 804 cannot obtain license information for part or all of the protected content, or if it determines that the protected content cannot be used, the output of a formed document does not necessarily have to be terminated. For example, it is possible to output a formed document with only part of the protected content and/or non-protected content whose license information has been obtained and that has been determined to be usable, in other words, usable objects.

The formed document output unit 807 performs an output process such as to display the formed document output by the object forming unit 805 on the monitor 514, or to prompt a printer as the peripheral apparatus 516 to print the formed document. Then, after having output the formed document, the formed document output unit 807 deletes the formed document and the decoded protected content that are present in the formed document output apparatus 103. As used herein, "after having output the formed document" refers to, for example, when the user has closed the display of the formed document on the screen, or when the formed document has finished printing.

Process Performed by Formed Document Output Apparatus

FIG. 10 is a flowchart illustrating an example of a processing procedure performed by the formed document output apparatus 103.

The formed document input unit 801 receives an input of a formed document (S900). The forming information analyzing unit 802 outputs the forming information of the input formed document to the object forming unit 805, and outputs the objects or object identifiers to the object management unit 803 (S901).

If the object identifiers are inputted from the forming information analyzing unit 802, the object management unit 803 obtains objects that are specified by the identifiers from a network or storage medium, and stores them on, for example, the HD 505. If the objects are input, the object management unit 803 stores the objects on the HD 505 (S902).

The object forming unit 805 requests the object usage control unit 804 to provide objects necessary to output a formed document based on the forming information (S903). In response to this request, the object usage control unit 804 requests the object management unit 803 to provide the objects (S904). The object management unit 803 reads out the objects from the HD 505 and outputs them to the object usage control unit 804 (S905).

Next, the object usage control unit 804 verifies if the objects requested by the object forming unit 805 are consumable through a primary evaluation (S906) and a secondary evaluation (S907). Although the details will be described later, the primary evaluation verifies whether or not each object is consumable, and the secondary evaluation verifies whether or not objects whose consumption or non-consumption is dependent on another object are consumable.

The consumption dependency relationship will be described below taking protected content, that is, objects A and B, as an example. Here, it is assumed that an allowed layout that specifies the object B to be output is defined in the policy of the object A as a condition value, and an allowed layout that specifies the object A to be output is defined in the policy of the object B as a condition value. In this case, the consumption or non-consumption of each object cannot be determined only by verifying whether not the object is consumable (primary evaluation). For this reason, it is necessary to perform a secondary evaluation to determine the consumption or non-consumption of the objects A and B.

If it is determined as a result of the secondary evaluation (S907) that all of the objects requested by the object forming unit 805 can be consumed (S908), the object usage control unit 804 decodes all of the objects and outputs them to the object forming unit 805 (S909). The object forming unit 805 consumes these objects to output a formed document (S910).

If, as a result of the secondary evaluation (S907), an object determined to be non-consumable is found (S908), the object usage control unit 804 obtains information indicative of whether or not all of the objects are necessary (S911). If not all of the objects are necessary (S912), the object usage control unit 804 decodes consumable objects and outputs them to the object forming unit 805 (S909). The object forming unit 805 consumes these objects to output a formed document (S910). If all of the objects are necessary (S912), the object usage control unit 804 provides a notification indicating that all of the objects are necessary to the object forming unit 805, and terminates the output of a formed document (S913).

Whether or not to output a formed document with only consumable objects can be determined by, for example, providing a display indicating to the UI that there is an object that cannot be used by the object usage control unit 804 so as to obtain a decision from the user of the formed document output apparatus 103. Alternatively, it can be determined by the object usage control unit 804 in accordance with preset criteria. It is of course possible that the object usage control unit 804 displays the reason why an object has been determined to be non-consumable on the UI in order to notify the user.

Primary Evaluation

Figure 11:
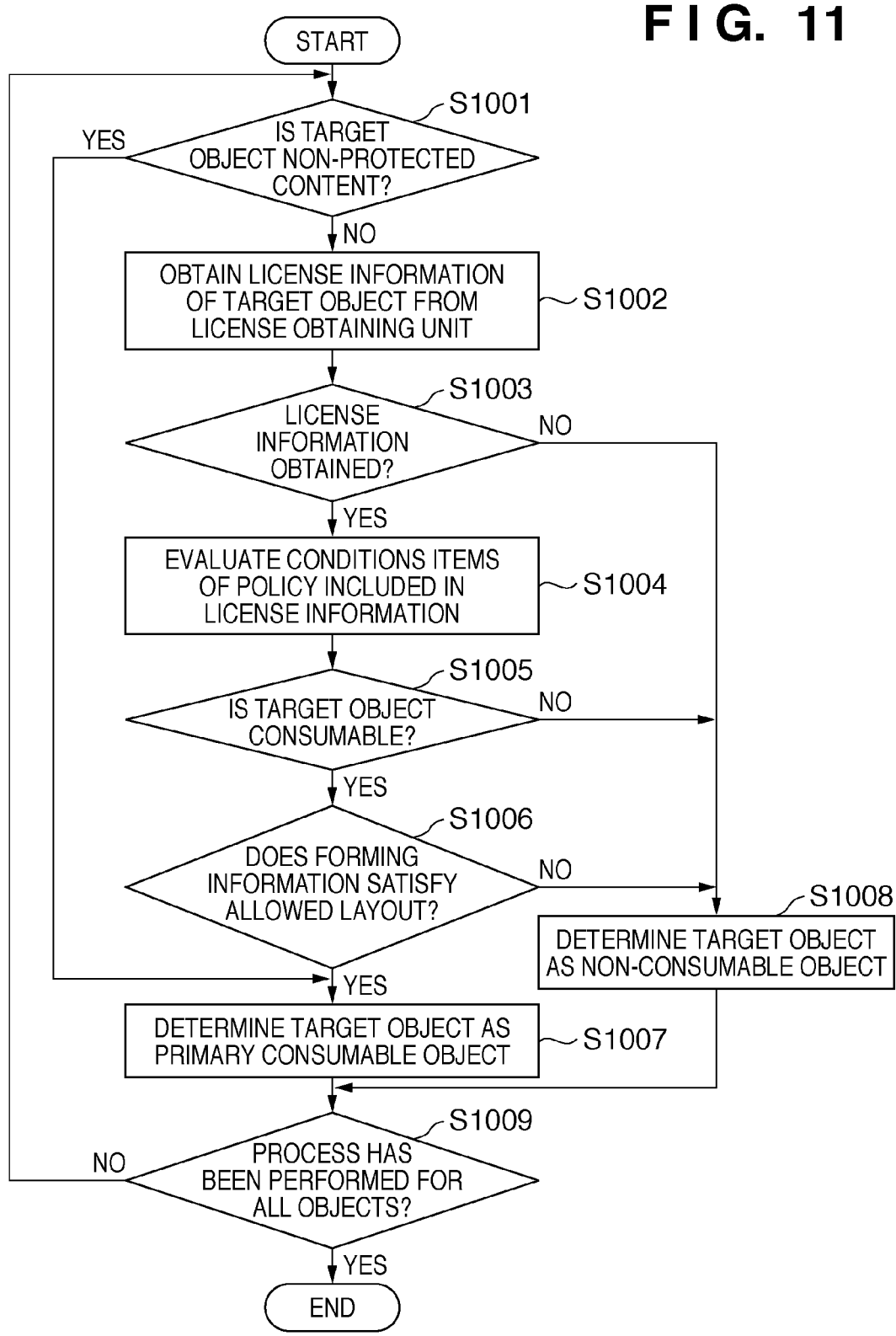
FIG. 11 is a flowchart illustrating a primary evaluation.

FIG. 11 is a flowchart illustrating the primary evaluation (S906).

The object usage control unit 804 selects a single object, and determines whether or not the selected object (hereinafter referred to as a "target object") is non-protected content (S1001). If the target object is non-protected content, the target object is determined as a primary consumable object (S1006).

If the target object is protected content, the object usage control unit 804 outputs meta information having been added to the content to the license obtaining unit 806, and obtains the license information of the content from the license obtaining unit 806 (S1002).

Next, the object usage control unit 804 determines whether or not it has obtained the license information (S1003). If the object usage control unit 804 cannot obtain the license information, the target object is determined as a non-consumable object (S1008). If the object usage control unit 804 can obtain the license information, the object usage control unit 804 evaluates the condition items of the policy included in the license information (S1004), and determines whether or not the target object is consumable (S1005). If the target object is consumable, it is determined whether or not the forming information of the formed document satisfies the allowed layout defined in the policy (S1006). If the forming information satisfies the allowed layout, the target object is determined as a primary consumable object (S1007).

Conversely, if the target object is determined to be non-consumable in step S1005, or if it is determined that the allowed layout is not satisfied in step S1006, the object usage control unit 804 determines the target object as a non-consumable object (S1007).

Next, the object usage control unit 804 determines whether or not the process ranging from steps S1001 to S1008 has been performed for all of the objects (S1009). If there are unprocessed objects, the processing returns to step S1001, and the process ranging from steps S1001 to S1008 is repeated a number of times equal to the number of the unprocessed objects.

Secondary Evaluation

Figure 12:
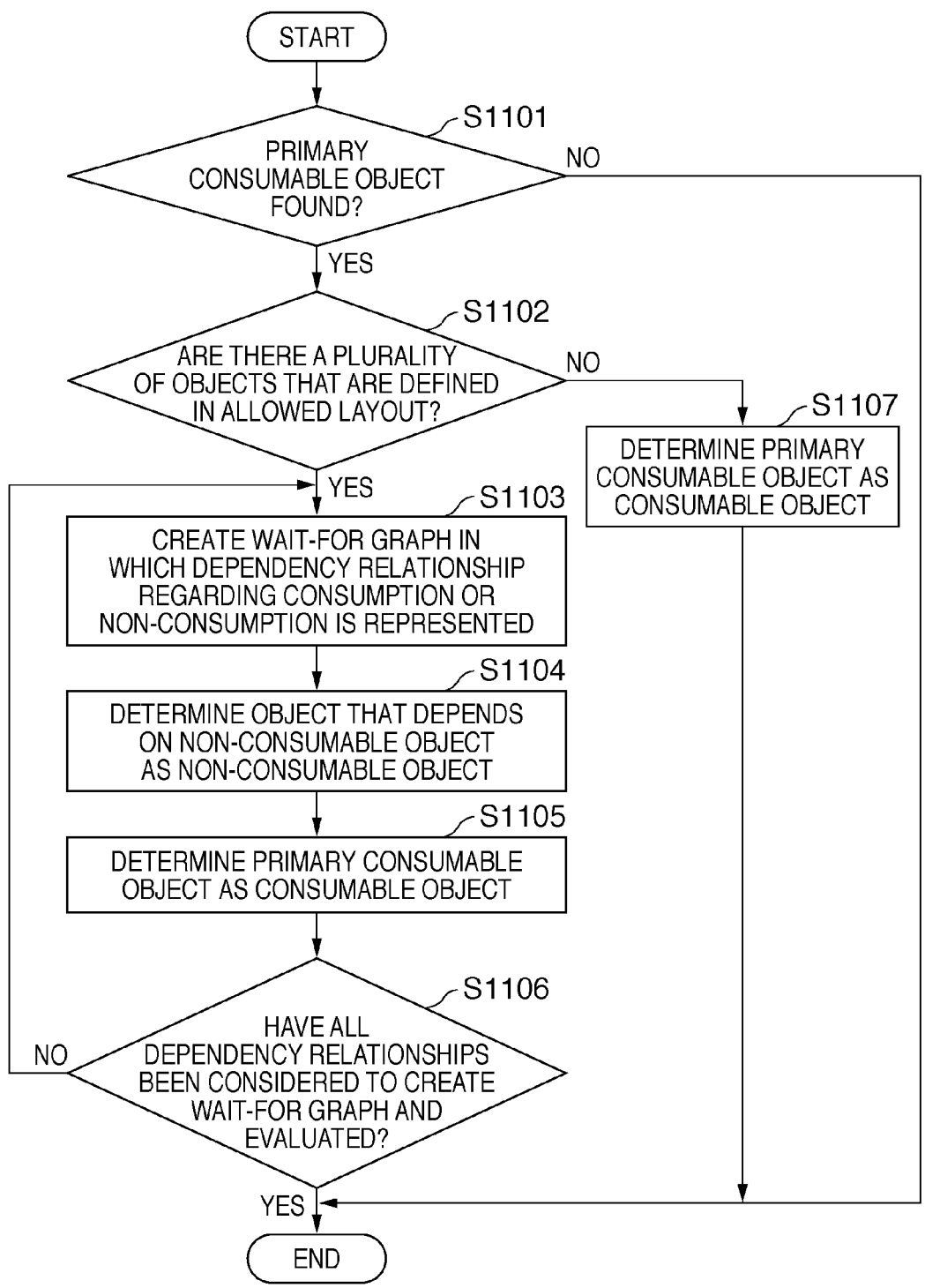
FIG. 12 is a flowchart illustrating a secondary evaluation.

FIG. 12 is a flowchart illustrating the secondary evaluation (S907).

The object usage control unit 804 determines whether or not there are primary consumable objects (S1101). If there is no primary consumable object, the secondary evaluation ends.

If a primary consumable object is found, the object usage control unit 804 determines whether or not there are a plurality of primary consumable objects that are defined in the allowed layout (S1102). If there is not more than one object that is defined in the allowed layout, all of the primary consumable objects are determined as consumable objects (S1107).

If there is a plurality of primary consumable objects that are defined in the allowed layout, the object usage control unit 804 creates a wait-for graph in which the dependency relationship regarding consumption or non-consumption is represented (S1103).

Figure 13A:
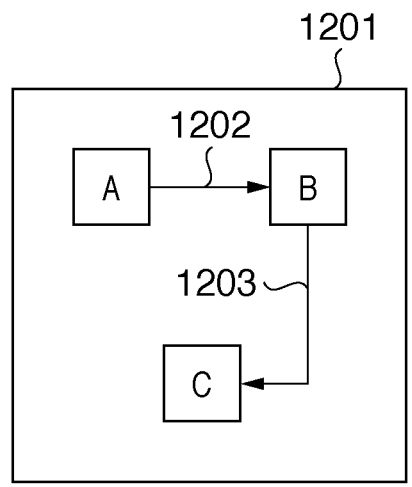
FIGS. 13A and 13B are diagrams illustrating an example of a wait-for graph.
Figure 13B:
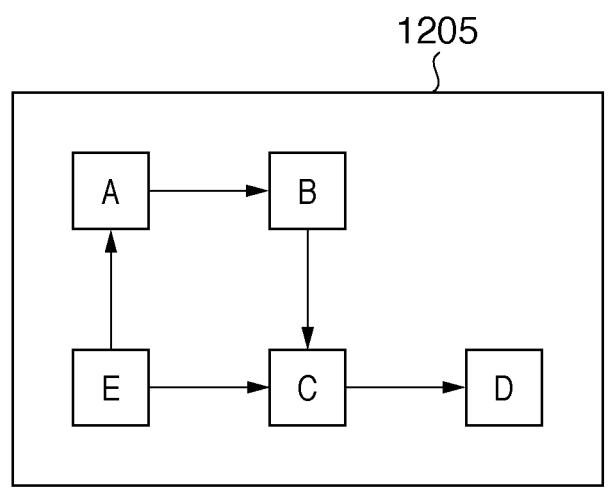

FIGS. 13A and 13B are diagrams illustrating an example of the wait-for graph. A wait-for graph 1201 shown in FIG. 13A represents the following dependency relationship regarding the consumption of objects.

The consumption or non-consumption of an object A depends on the consumption or non-consumption of an object B. Arrow 1202 indicates the relationship between the object A (hereinafter referred to as "dependent object") whose consumption depends on that of another object and the object B (hereinafter referred to as "depended object") whose consumption affects that of another object. The head of arrow indicates a depended object i. That is, when the allowed layout defined in the policy of the object A specifies the object B to be output, and if the object B is not consumable, the object A cannot be consumed. In other words, if the object B is consumable, the object A is also consumable.

Likewise, arrow 1203 indicates a depended object C that is depended by the dependent object B. Because there is no arrow extending from the object C, the object C is not a dependent object. Accordingly, if the object C is a primary consumable object, the objects C, B and A are determined as consumable objects (it goes without saying that it is necessary that the objects B and A are primary consumable objects). Conversely, if the object C is a non-consumable object, the objects B and A are determined as non-consumable objects even if the objects B and A are primary consumable objects. That is, primary consumable objects that depend on a non-consumable object are determined as non-consumable objects (S1104).

In a wait-for graph 1205 shown in FIG. 13B, if a depended object D is a non-consumable object, objects A, B, C and E are all determined as non-consumable objects (S1104). If only the object B is a non-consumable object, the objects A and E that depend on the depended object B are determined as non-consumable objects (S1104), and the objects D and C are determined as consumable objects (S1105).

Next, the object usage control unit 804 creates a wait-for graph based on the dependency relationship regarding the consumption or non-consumption of all objects, and determines whether or not the evaluation of step S1104 has been performed (S1106). If there is an unevaluated dependency relationship, the processing returns to step S1103, and the process ranging from steps S1103 to S1105 is repeated.

As described above, the consumption of protected content (objects) defined in an allowed layout as a policy is allowed only when a formed document that has an object configuration preset by the administrator is specified to be output. Accordingly, because protected content can be specified to be output by a formed document in which intended forming information is written, it is possible to prevent protected content from being output as a formed document having an object configuration that is not intended by the administrator. To put it differently, by authenticating the forming information of a formed document that specifies content to be output as objects, the usage of the content can be controlled such that the content is output as objects of the formed document that has an object configuration intended by the administrator.

[Variation 1]

Variation 1 of Embodiment 1 will be described below. Embodiment 1 given above illustrated an example using the size and position in a page and the identifier of objects as feature amounts of forming information. However, when an overlap between objects and/or the output intensity of an object are specified as forming information, there is a possibility that protected content may be outputted as a formed document having an object configuration that is not intended by the administrator.

As used herein, "overlap between objects" refers to, for example, when an image A and an image B are specified to be output in the same coordinate region of a page, a value that determines which image to be visibly output in that region. In this variation, an overlap is referred to as a "layer", and it is assumed that priority is given to an object having a high layer over an object having a low layer and thus the object having a high layer is visibly output. That is, if a plurality of objects is specified to be output in the same coordinate region, an object having a high layer is output instead of an object having a low layer. The overlap between objects may be, for example, interpreted implicitly by the formed document output apparatus that outputs a formed document such that an object that is declared later in the formed document has a layer higher than that of an object that is declared earlier, or the layer values of objects that are explicitly defined in the formed document may be interpreted by the formed document output apparatus.

The "output intensity of an object" is a parameter that is considered when a plurality of objects is output in the same coordinate region with the same temporal axis. For example, in the case of an object being an image, a parameter of the image that is expressed in a range from 0 to 1 as typified by an alpha value ($\alpha$ value) such as transparency, is regarded as output intensity. If the alpha value is 0, the image is not output visibly. Instead, an object having a layer lower than that of the object is visibly output. Normally, in document content, the background is implicitly interpreted as an object having the lowest layer, and an object such as a white background or background image is visibly output. If the alpha value is 1, the object image is output. If the alpha value is specified as 0.5, an object having a layer lower than that of the object is combined and visibly output. In the case of an object being sound or voice, its loudness (volume) is regarded as output intensity.

For example, in a formed document that specifies content whose usage is controlled by the policy 301 to be output, if the transparency of the object A is intentionally or accidentally set to 0 (regardless of the forming information satisfying the policy 301), the content is visibly output with a layout configuration that is not intended by the administrator. In other words, if the object A is specified to be output in the forming information and at the same time the transparency of the object is set to 0, the output formed document will be different from the intension of the content administrator. Similarly, if another object X having a layer higher than that of the object A is specified to be output in the same region as the object A, the object A is overwritten with the object X, and as a result, the output formed document will be different from the intension of the content administrator.

In view of the above, in Variation 1, an overlap (layer) between objects and/or the output intensity of an object is further specified as a feature amount.

FIG. 15 shows an example of a policy in which the transparency of an object and an overlap between objects are added. In a policy 1601, an <AlphaChannel> tag specifies the transparency of an object with its <Value> attribute. In the policy 1601, the transparency is specified to a fixed value of 1, but it may be specified to a range, for example, ranging from 0.9 to 1. In a <Layer> tag, an overlap between objects is specified with its <Value> attribute. The overlap is information that represents a relative relationship, which only shows that a layer is higher or lower with respect to that of another object, and thus it is possible to specify MAX (highest layer) or MIN (lowest layer) in a specified coordinate region, or a value such as a value that indicates it is within the top third.

As just described, by specifying the transparency of an object and/or an overlap between objects in addition to the feature amounts represented by the position and size of objects specified in Embodiment 1, a formed document that specifies content to be output as objects can be controlled more precisely.

[Variation 2]

Embodiment 1 given above illustrated an example in which forming information and an allowed layout are compared (S1006) to determine whether or not a target object is consumable. However, a configuration is also possible in which a signature of the owner of content is added to forming information in advance, and the consumption of objects is allowed only when a signature verification succeeds. In this case, the formed document generating unit 702 performs a signature process using a secret key owned by the owner of content when generating a formed document.

FIG. 14 is a diagram illustrating an example of a signature, showing signature information that is included in forming information.

A <Signature> tag defines signature information. An <ID> tag within the <Signature> tag defines information of an object to which the signature is given. A <Value> tag defines a signature value. Likewise, a <Key> tag defines key information used to verify the signature.

With a description of the <ID> tag, a specific tag within a layout file can be specified. For example, if Layout.xml/Page is written as the value of the <ID> tag, the <Page> tag within Layout.xml is specified. When a signature is added as a part of a layout file as just described, forming information may be written so as to satisfy the signature when outputting a formed document. Through this, it is possible to prevent unauthorized forming information from being added and objects from being located and output with a layout that is not intended by the administrator. In other words, the usage of objects (content) can be controlled such that the objects are located and output with a layout intended by the administrator.

The foregoing described an example in which an allowed layout of the protected objects generated by the protected content generating apparatus 101 is written in a policy included in license information and is input to the formed document output apparatus 103.

However, it is also possible to store information indicative of an allowed layout in protected content, or embed information indicative of an allowed layout in protected content using an electronic watermarking technique. When outputting a formed document, the formed document output apparatus 103 extracts the information indicative of an allowed layout stored or embedded in the protected content and controls the usage of the protected content.

Other Embodiments

The present invention may be applied to a system configured of a plurality of devices (e.g., a computer, an interface device, a reader, a printer, etc.) or to an apparatus configured of a single device (e.g., a copy machine, a facsimile device, etc.).

The object of the present invention can also be achieved by supplying a storage medium in which a computer program that realizes the functions of the aforementioned embodiment is recorded to a system or an apparatus, and executing the computer program with a computer (CPU or MPU) of the system or apparatus. In this case, software itself that is loaded from the storage medium realizes the functions of the above-described embodiment, and the computer program and a computer-readable storage medium that stores the computer program falls within the scope of the present invention.

The functions described above are realized not only by execution of the computer program. The present invention also encompasses the case where, for example, the operating system (OS) running on the computer and/or a first, second, third or consequent program performs part or all of the actual processing in accordance with the instructions from the computer program, and the functions described above are realized by that processing.

The computer program may be written in the memory of a device such as a function expansion card or function expansion unit connected to the computer. That is, the present invention also encompasses the case where the CPU, etc. of a first, second, third or consequent device performs part or all of the actual processing in accordance with the instructions from the computer program, and the functions described above are realized by that processing.

When the present invention is applied to the aforesaid storage medium, a computer program that corresponds or relates to the above-described flowcharts is stored.

As described above, according to the present invention, it is possible to control the usage of objects in accordance with a layout intended by the content administrator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-259235, filed on Oct. 2, 2007, which is hereby incorporated by reference herein in its entirety.

What is claimed is:

1. An information processing apparatus comprising:
an input unit configured to input (i) forming information related to a layout, (ii) a plurality of objects, and (iii) a policy, the policy including information on permission of usage of the plurality of objects, information on allowance of usage related to a layout for the plurality of objects and information on the dependency relationship between the plurality of objects;
a first determination unit configured to determine based on the policy, for each of the plurality of objects, whether or not the usage of the object is permitted;
a second determination unit configured to determine based on the policy whether or not the forming information satisfies an allowed layout;

a first setting unit configured to set a status of the object as a consumable object in the case that the first determination unit determines that the usage of the object is permitted and the second determination unit determines that the forming information satisfies the allowed layout, and to set the status of the object as a non-consumable object in the case that the second determination unit determines that the forming information does not satisfy the allowed layout or the first determination unit determines that the usage of object is not permitted;

a second setting unit configured to set, using the information on the dependency relationship between the plurality of objects included in the policy, the status of the object as a non-consumable object when the object is dependent on a non-consumable object; and an output unit adapted to lay out and output the objects whose statuses are set as consumable objects, wherein the output unit does not output the objects whose statuses are set as non-consumable objects, wherein one of the first determination unit, the second determination unit, the first setting unit, and the second setting unit comprises a processor.

2. The information processing apparatus according to claim 1, wherein the layout information is at least one of a position in which an object is located, a size to which an object is formed, a transformation specification of an object, an output intensity of an object, and overlap information between objects.

3. An information processing method comprising the steps of: inputting (i) forming information related to a layout, (ii) a plurality of objects, and (iii) a policy which includes information on permission of usage of the plurality of objects, information on allowance of usage related to a layout for the plurality of objects and information on the dependency relationship between the plurality of objects;

determining in a first determining step, based on the policy, for each of the plurality of objects, whether or not the usage of the object is permitted;

determining in a second determining step, based on the policy whether or not the forming information satisfies an allowed layout;

setting a status of the object as a consumable object in the case that the first determination step determines that the usage of the object is permitted and the second determination step determines that the forming information satisfies the allowed layout, and setting the status of the object as a non-consumable object in the case that the second determination step determines that the forming information does not satisfy the allowed layout or the first determination step determines that the usage of object is not permitted;

setting, using the information on the dependency relationship between the plurality of objects included in the policy, the status of the object as a non-consumable object when the object is dependent on a non-consumable object; and laying out and outputting the objects whose statuses are set as consumable objects, wherein the output unit does not output the objects whose statuses are set as non-consumable objects.

4. The information processing method according to claim 3, wherein the layout information is at least one of a position in which an object is located, a size to which an object is formed, a transformation specification of an object, an output intensity of an object, and overlap information between objects.

5. A non-transitory computer-readable storage medium in which a computer program is recorded, wherein the computer program causes a computer to function as an information processing apparatus including:

an input unit configured to input (i) forming information related to a layout, (ii) a plurality of objects, and (iii) a policy which includes information on permission of usage of the plurality of objects, information on allowance of usage related to a layout for the plurality of objects and information on the dependency relationship between the plurality of objects;

a first determination unit configured to determine based on the policy, for each of the plurality of objects, whether the usage of the object is permitted;

a second determination unit configured to determine based on the policy whether the forming information satisfies an allowed layout;

a first setting unit configured to set a status of the object as a consumable object in the case that the first determination unit determines that the usage of the object is permitted and the second determination unit determines that the forming information satisfies the allowed layout, and to set the status of the object as a non-consumable object in the case that the second determination unit determines that the forming information does not satisfy the allowed layout or the first determination unit determines that the usage of object is not permitted;

a second setting unit configured to set, using the information on the dependency relationship between the plurality of objects included in the policy, the status of the object as a non-consumable object when the object is dependent on a non-consumable object; and an output unit configured to lay out and output the objects whose statuses are set as consumable objects, wherein the output unit does not output the objects whose statuses are set as non-consumable objects.

* * * * *